United States Patent [19]
Bailey

[11] Patent Number: 5,331,980
[45] Date of Patent: Jul. 26, 1994

[54] TOBACCO STRIPPER APPARATUS

[76] Inventor: Haskel Bailey, P.O. Box 264, Salyersville, Ky. 41465

[21] Appl. No.: 967,851

[22] Filed: Oct. 28, 1992

[51] Int. Cl.5 .................. A24B 1/00; A01D 45/16
[52] U.S. Cl. ................... 131/290; 460/134; 460/136; 460/140; 56/27.5
[58] Field of Search .............. 131/313, 319, 290; 460/134, 136, 140; 56/27.5; 171/55, 56, 58

[56] References Cited

U.S. PATENT DOCUMENTS

| | | | |
|---|---|---|---|
| 641,320 | 1/1900 | Parrish | 460/136 |
| 646,908 | 4/1900 | House | 460/136 |
| 3,970,091 | 7/1976 | Banks et al. | 131/313 |
| 4,350,172 | 9/1982 | Guthrie . | |
| 4,373,323 | 2/1983 | Jones | 460/134 X |
| 4,509,536 | 4/1985 | Bennett et al. . | |
| 4,773,434 | 9/1988 | Miyake et al. | 131/313 X |
| 4,836,220 | 6/1989 | Miyake et al. | 56/27.5 X |
| 5,044,115 | 9/1991 | Richardson | 460/134 X |

*Primary Examiner*—Jennifer Doyle
*Attorney, Agent, or Firm*—Leon Gilden

[57] ABSTRACT

A tobacco stripper includes coplanar first and second stripper plates having confronting semi-cylindrical recesses coaxial relative to one another. The first stripper plate is arranged in a spring-biased relationship for contiguous communication with the second stripper plate to receive a tobacco leaf therethrough to effect stripping of tobacco relative to the tobacco leaf stalk as the stalk is drawn through the first and second semi-cylindrical recess by cooperative first and second rollers mounted in a biased relationship towards one another to receive, engage, and draw a tobacco stalk therebetween.

5 Claims, 4 Drawing Sheets

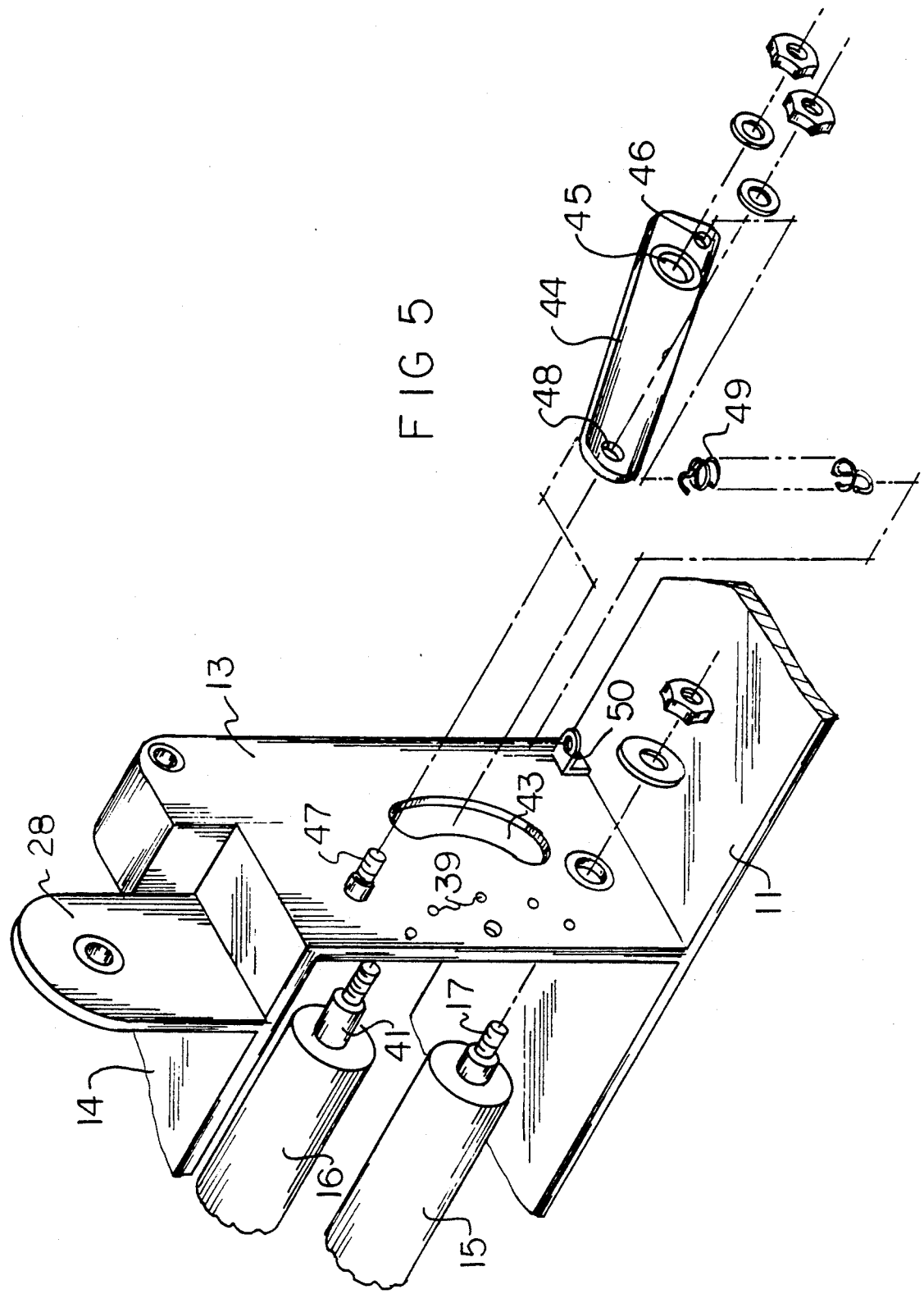

TOBACCO STRIPPER APPARATUS

BACKGROUND OF THE INVENTION

1. Field of the Invention

The field of the invention relates to tobacco stripper apparatus, and more particularly pertains to a new and improved tobacco stripper apparatus wherein the same is arranged to provide for an adjustable stripper plate structure arranged to accommodate varying configurations of tobacco stalk structure therethrough.

2. Description of the Prior Art

Tobacco stripper apparatus of various types have been utilized in the prior art and exemplified in U.S. Pat. Nos. 4,509,536; 4,493,330; 4,836,220; and 4,350,172.

The prior art has heretofore set forth relatively complex and elaborate construction as opposed to the instant invention setting forth cooperative tobacco rolls to direct tobacco leaves to be stripped through an eyelet opening and in this respect, the present invention substantially fulfills this need.

SUMMARY OF THE INVENTION

In view of the foregoing disadvantages inherent in the known types of tobacco stripper apparatus now present in the prior art, the present invention provides a tobacco stripper apparatus wherein the same employs work rolls to receive, secure, and direct a tobacco stalk therebetween simultaneously drawing a tobacco leaf structure to be stripped from the stalk through an eyelet opening between spring-biased coplanar plates. As such, the general purpose of the present invention, which will be described subsequently in greater detail, is to provide a new and improved tobacco stripper apparatus which has all the advantages of the prior art tobacco stripper apparatus and none of the disadvantages.

To attain this, the present invention provides a tobacco stripper including coplanar first and second stripper plates having confronting semi-cylindrical recesses coaxial relative to one another. The first stripper plate is arranged in a spring-biased relationship for contiguous communication with the second stripper plate to receive a tobacco leaf therethrough to effect stripping of tobacco relative to the tobacco leaf stalk as the stalk is drawn through the first and second semi-cylindrical recesses by cooperative first and second rollers mounted in a biased relationship towards one another to receive, engage, and draw a tobacco stalk therebetween.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tobacco stripper apparatus which has all the advantages of the prior art tobacco stripper apparatus and none of the disadvantages.

It is another object of the present invention to provide a new and improved tobacco stripper apparatus which may be easily and efficiently manufactured and marketed.

It is a further object of the present invention to provide a new and improved tobacco stripper apparatus which is of a durable and reliable construction.

An even further object of the present invention is to provide a new and improved tobacco stripper apparatus which is susceptible of a low cost of manufacture with regard to both materials and labor, and which accordingly is then susceptible of low prices of sale to the consuming public, thereby making such tobacco stripper apparatus economically available to the buying public.

Still yet another object of the present invention is to provide a new and improved tobacco stripper apparatus which provides in the apparatuses and methods of the prior art some of the advantages thereof, while simultaneously overcoming some of the disadvantages normally associated therewith.

These together with other object of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of the biasing lever structure arranged to bias the second roll relative to the first roll.

DESCRIPTION OF THE PREFERRED EMBODIMENT

Figure 1:
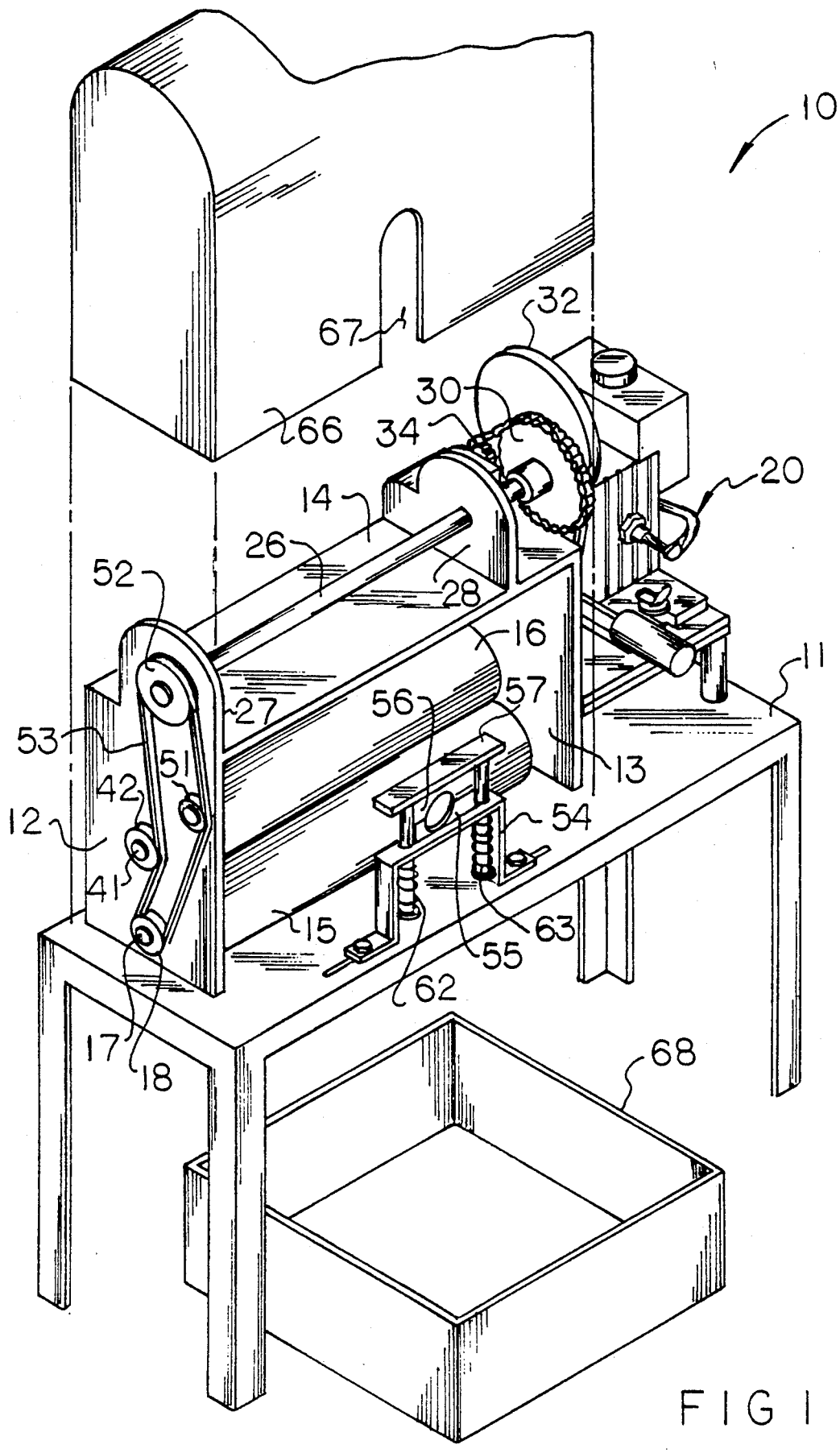
FIG. 1 is an isometric illustration of the invention.
Figure 2:
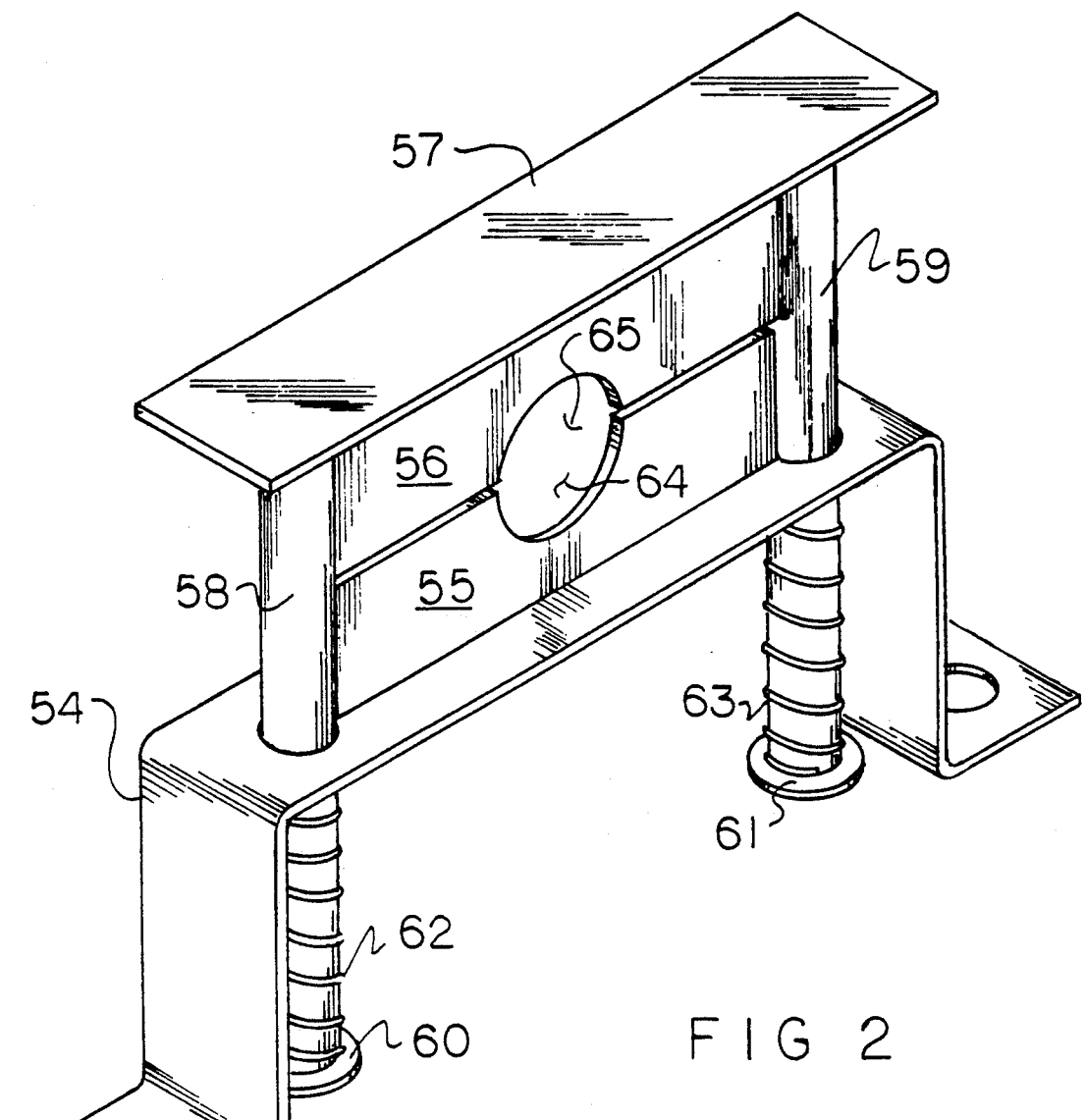
FIG. 2 is an enlarged isometric illustration of the tobacco stripper plates utilized by the invention.
Figure 3:
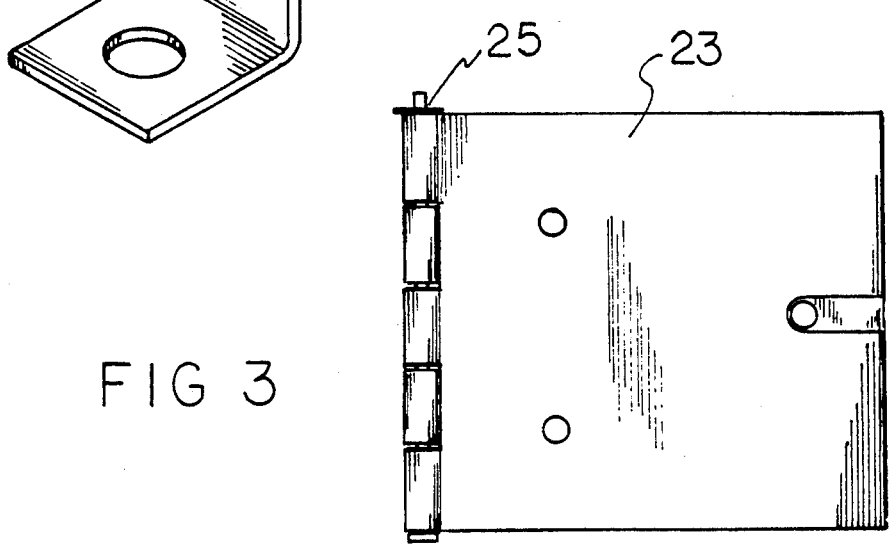
FIG. 3 is an orthographic side view of the drive motor mounting plate structure.
Figure 4:
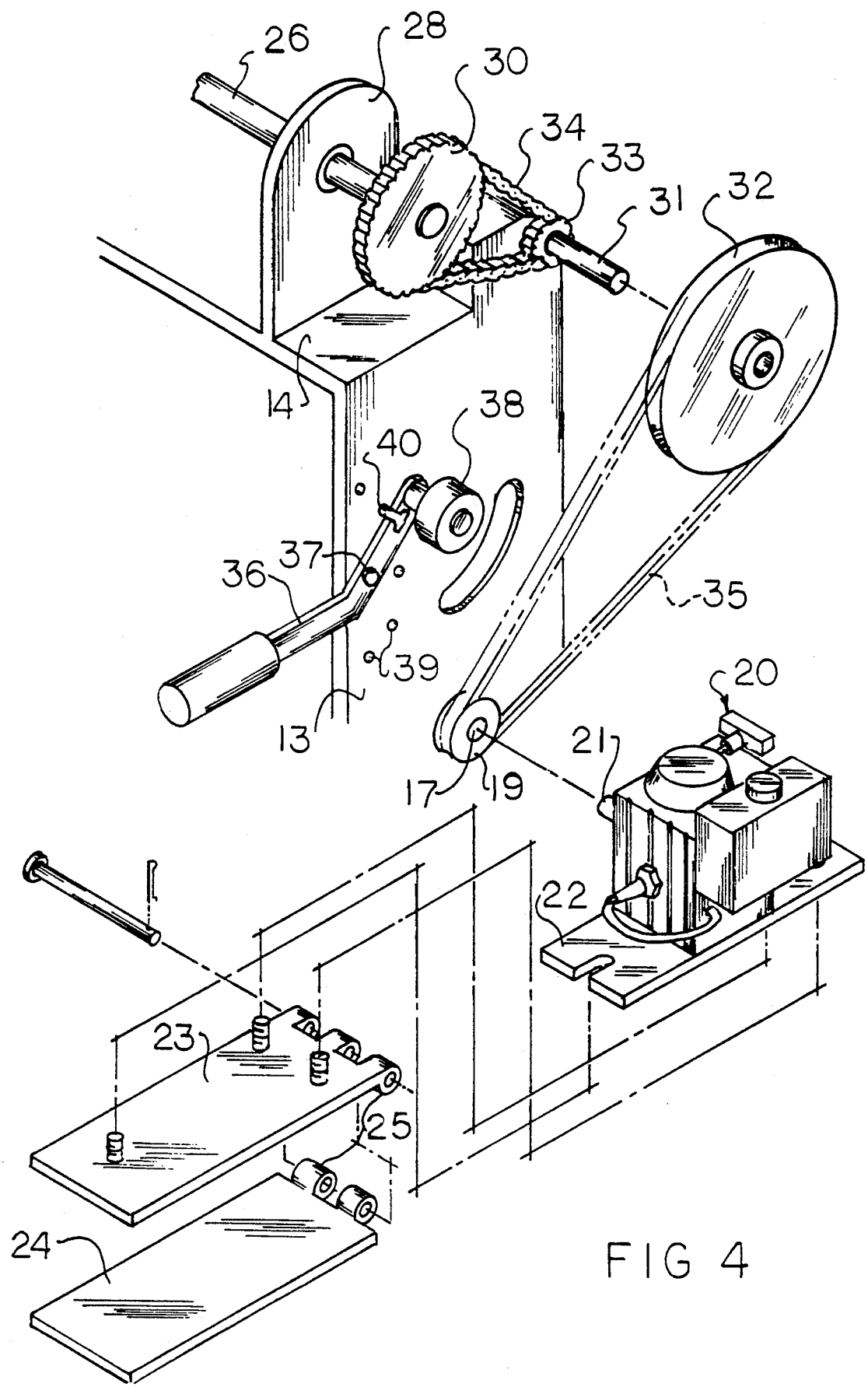
FIG. 4 is an isometric illustration of the drive motor structure utilized by the invention arranged to direct power to the first and second rolls of the invention.

With reference now to the drawings, and in particular to FIGS. 1 to 5 thereof, a new and improved tobacco stripper apparatus embodying the principles and concepts of the present invention and generally designated by the reference numeral 10 will be described.

More specifically, the tobacco stripper apparatus 10 of the instant invention essentially comprises a support table 11 having a first plate 12 and a second plate 13 parallel relative to one another and orthogonally mounted to the support table 11, with a first roller 15 and a second roller 16 arranged in communication to one another to define a roller nip therebetween to direct a tobacco stalk (not shown) through the confronting and engaging first and second rollers 15 and 16. A connecting flange 14 extends orthogonally over the first and second plates 12 and 13 providing rigidity to the mounting of the roller structure. The first roller 15 is rotatably mounted about a first roller shaft 17, with the second roller 16 rotatably mounted about a second roller shaft 41. The first roller shaft 17 includes a first shaft first pulley 18 mounted thereto positioned in adjacency to the first plate 12, with the first plate 12 positioned between the first roller shaft pulley 17 and the first roller 15. A mounting pulley 19 is mounted to the second plate 13 in cooperation with the drive motor 20 having an output shaft 21 mounting the mounting plate 19 thereto. The drive motor 20 is mounted upon a support flange 22 that in turn is mounted to cooperative first and second support flanges 23 and 24 hingedly mounted to one another about a flange hinge 25 to permit angular adjustment of the drive motor and proper orientation of the drive motor relative to the mounting pulley 19 and the second plate 13. A driven shaft 26 is provided rotatably mounted within respective first and second parallel support plates 27 and 28 orthogonally mounted extending upwardly of the connecting flange 14. A driven shaft sprocket 30 is mounted to the driven shaft cooperative with an idler sprocket 33 mounted to an idler shaft 31. An idler pulley 32 is mounted to the idler shaft, having a primary drive belt 35 interconnecting the idler shaft pulley 32 and the mounting pulley 19. A drive belt (typically as a chain) 34 is directed between the driven shaft sprocket 30 and the idler shaft sprocket 33 to impart rotary motion to the driven shaft 26 from the drive motor 20.

An idler leg 36 is pivotally mounted about an idler leg pivot axle 37 that in turn is orthogonally and fixedly mounted to the second plate 13, the mounting pulley 19, and the driven shaft 26. The idler leg 36 includes an idler leg cylinder 38 arranged for imposing rotatably upon the primary drive belt 35 to impart tension thereto. To enhance the proper orientation of the idler leg cylinder 38 onto the primary drive belt 35, an arcuate array of adjuster receiving bores 39 are provided concentrically about the idler leg pivot axle 37, with an adjuster rod 40 arranged for reception with one of the receiving bores 39 to provide for proper orientation of the idler leg cylinder 38 against the primary drive belt 35.

An second roller shaft 41 includes a second shaft pulley 42 spaced exteriorly of the first plate 12. An arcuate slot 43 is directed through the second plate 13, with the second roller shaft 41 directed through the arcuate slot 43 and mounted through a biasing plate 44, and more specifically a biasing plate shaft receiving bore 45 within the biasing plate adjacent a first end of the biasing plate, having a spring-receiving bore 46 directed through the biasing plate between the shaft receiving bore 45 and the first end. A biasing spring 49 is connected between the spring-receiving bore 46 and an anchor plate 50 positioned below the arcuate slot 43. A biasing plate axle bore 48 receives a pivot axle 47 therethrough to pivotally mount the biasing plate 44 and accordingly bias the second roller 16 into engagement with the first roller to provide for receiving a tobacco stalk therebetween, as well as providing for accommodation and displacement of the second roller relative to the first roller.

A second plate idler pulley 51 is mounted to the first plate 12, with a secondary drive belt 53 arranged to direct rotative force from the driven shaft pulley 52 mounted to the driven shaft 26 to the second roller shaft pulley 42, the second roller plate idler pulley 51, and the first shaft first pulley 18.

A U-shaped support bracket 54 is mounted to the support table 11, with a first and second stripper plate 55 and 56 that are arranged in coplanar relationship relative to one another and orthogonally to the table 11. A cap plate 57 is mounted to the second stripper plate 56 to include respective first and second rods 58 and 59 orthogonally mounted to the cap plate extending from the cap plate, slidably through the U-shaped support bracket 54, with the first and second rods 58 and 59 having respective first and second rod end caps 60 and 61 to capture respective first and second springs 62 and 63 between the first and second rod caps 60 and 61 and the U-shaped support bracket 54 to bias the second plate 56 and the first plate 55. A first semi-cylindrical recess 64 is arranged in confronting relationship to a second semi-cylindrical recess 65 that are coaxially aligned when the first and second plates are in contiguous communication, as indicated in FIG. 1. The upper edge of the first stripper plate 55 includes a first recess therewithin, with the lower edge of the second stripper plate 56 having a second recess 65 extending therefrom into the second stripper plate. In this manner, tobacco directed through the stripper bore defined by the first and second recesses 64 and 65 strips the tobacco leaf as the stalk is directed between the first and second rollers 15 and 16.

A cover hood 66 is provided, as indicated in FIG. 1, having a cover hood slot 67 arranged in an aligned orientation relative to the stripper bore and further as a tobacco stalk is stripped with the slot 67 oriented between the stripper plates and the rollers. A receiving container 68 is positioned below the table to receive the thusly stripper tobacco leaf for subsequent processing.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tobacco stripper apparatus, comprising,
a support table, the support table including first and second parallel plates orthogonally mounted to the support table mounting a first roller and a second roller therebetween, wherein the first roller and second roller are arranged for contiguous communication to define a roller nip therebetween, the first roller having a first roller shaft directed orthogonally through the first support plate and the second support plate, and the second roller having a second roller shaft directed through the first support plate, and the second support plate having a second support plate arcuate slot receiving the second roller shaft therethrough, and
biasing means mounted to the second roller shaft extending through the second plate arcuate slot to bias the first roller into communication with the second roller, and
drive means for effecting simultaneous rotation of the first roller and the second roller, and
stripper plate means mounted to the support table between one end of the support table and the first roller shaft and the second roller for stripping a tobacco stalk directed through the stripper plate means.

2. An apparatus as set forth in claim 1 wherein the stripper plate means includes a U-shaped support bracket mounted to the support table, the U-shaped support bracket including a first stripper plate fixedly mounted to the bracket spaced above the bracket, with the first stripper plate orthogonally oriented relative to the support table, and a second stripper plate coplanar with the first stripper plate, the second stripper plate having a cap plate, the cap plate including a first rod and a second rod fixedly mounted orthogonally to the cap plate, with the first rod and second rod slidably directed through the U-shaped support bracket, and the first rod having a first rod cap positioned below the first stripper plate, and the second rod having a second rod cap positioned below the second support plate, and a first spring captured between the first rod cap and the U-shaped support bracket, and a second spring captured between the second rod cap and the U-shaped support bracket to bias the first stripper plate into communication with the second stripper plate, with the first stripper plate having a first semi-cylindrical recess, and the second stripper plate having a second semi-cylindrical recess arranged in confronting relationship relative to the first semi cylindrical recess defining a stripper bore, with the first spring and the second spring arranged to bias the first stripper plate and the second stripper plate together.

3. An apparatus as set forth in claim 2 including a mounting pulley mounted rotatably to the second plate, and an idler shaft mounted orthogonally relative to the second plate having an idler shaft sprocket, and a driven shaft oriented parallel to and above the first roller shaft and above the first plate and the second plate rotatably mounted relative to the first plate and the second plate in a substantially coextensive relationship, with the driven shaft having a driven shaft sprocket and a drive belt extending between the idler shaft sprocket and the driven shaft sprocket, and the idler shaft having an idler shaft pulley, and the idler shaft pulley including a primary drive belt extending between the mounting pulley and the idler shaft pulley, and the drive motor arranged for operative communication with the mounting pulley to effect rotation of the mounting pulley and effect rotation of the driven shaft through the idler shaft, with the driven shaft having a driven shaft pulley mounted to the driven shaft spaced from the driven shaft sprocket, with the driven shaft pulley positioned in alignment and over the first shaft pulley, and a second roller shaft pulley mounted to the second roller shaft positioned in adjacency relative to the driven shaft pulley, and a secondary drive belt extending in operative communication with the driven shaft pulley, the first shaft pulley, and the second shaft pulley to effect rotation of the first roller and the second roller.

4. An apparatus as set forth in claim 3 wherein the biasing means includes a biasing plate having a first end and a second end, with the first end including a spring-receiving bore, the second end including an axle receiving bore, and a pivot axle mounted to the second plate in an orthogonal relationship, and the pivot axle received through the axle receiving bore, and a shaft receiving bore oriented through the biasing plate between the first end and the second end and between the axle receiving bore and the spring-receiving bore, and a spring anchor plate positioned below the arcuate slot, with a spring member mounted between the anchor plate and the spring receiving bore to bias the second axle shaft towards the first roller.

5. An apparatus as set forth in claim 4 including a cover hood, the cover hood extending over the first roller and the second roller, and the cover hood having a slot oriented between the stripper bore and the first roller and the second roller, with the cover hood slot aligned with the stripper bore, and a receiving container positioned below the support table and below the first stripper plate and second stripper plate.

* * * * *